United States Patent
Hatch et al.

[15] 3,651,880
[45] Mar. 28, 1972

[54] MOTOR DRIVEN PASSENGER VEHICLE

[72] Inventors: Edwin B. Hatch, Grafton; Steven Schwengel, Milwaukee, both of Wis.

[73] Assignee: Brookfield Industries, Inc., Brookfield, Wis.

[22] Filed: Nov. 24, 1969

[21] Appl. No.: 879,164

[52] U.S. Cl. .......................................... 180/6 R, 115/1 R
[51] Int. Cl. .................................................. B62m 27/02
[58] Field of Search ............................ 180/5, 6, 3; 115/1

[56] References Cited

UNITED STATES PATENTS

| 2,528,890 | 11/1950 | Lawrence | 180/5 |
|---|---|---|---|
| 2,711,708 | 6/1955 | Thornburg | 115/50 |
| 3,180,442 | 4/1965 | Pomeroy | 180/6 |
| 3,190,255 | 6/1965 | Olson | 180/3 X |
| 3,403,745 | 10/1968 | Commons | 115/1 X |
| 3,419,095 | 12/1968 | Hood | 180/6 |
| 3,521,718 | 7/1970 | Masaoka et al. | 180/5 X |

FOREIGN PATENTS OR APPLICATIONS

| 618,788 | 3/1961 | Italy | 180/3 |
|---|---|---|---|
| 1,298,357 | 6/1962 | France | 180/5 |

*Primary Examiner*—Leo Friaglia
*Attorney*—Cyril M. Hajewski

[57] ABSTRACT

A passenger carrying vehicle having a passenger carrier that is propelled by a rear power unit. The passenger carrier is pivotally connected to a power unit which is behind the carrier to push it along the desired path of travel. A control linkage enables the passenger to pivot the power unit relative to the carrier for steering the vehicle. The power unit includes an engine connected to drive a single driving wheel which is in engagement with the ground.

5 Claims, 3 Drawing Figures

PATENTED MAR 28 1972 3,651,880

Inventors
Edwin B. Hatch
Steven Schwengel
By Cyril M. Hajewski
Attorney

MOTOR DRIVEN PASSENGER VEHICLE

BACKGROUND OF THE INVENTION

The present invention pertains to passenger vehicles especially designed to provide sport and recreation and adapted to travel over different types of terrain including very rough terrain as well as over ice and snow.

A variety of motor driven passenger vehicles have been designed to serve many different purposes and to satisfy a multitude of desires. However, the present invention provides an entirely new concept in passenger vehicles and provides the rider with new experiences in negotiating almost any type of terrain.

An important feature of the present invention resides in the fact that it is extremely economical to produce as well as to operate and maintain. Motor driven passenger vehicles are usually relatively expensive because of their complexity. The present invention provides an extremely simple construction that can be manufactured at minimum cost and which can withstand extremely rough usage as a result of its simplicity because there are relatively few parts that can fail in operation.

In prior art passenger vehicles the passenger is usually seated a substantial height above the ground with the passenger seats being mounted in a frame that is carried above the wheel axles or above the tracks in a track laying vehicle. On the other hand, the vehicle constructed in accordance with the teachings of the present invention provides a passenger carrier in which the passenger is seated directly above the ground to provide a new experience for recreational purposes as well as to facilitate negotiating rough terrain and ice or snow.

It also has been the practice in the past to design a passenger vehicle for a particular purpose such as a vehicle for riding over relatively smooth roads or another vehicle for traversing rough terrain while a special vehicle is provided for traveling over snow and ice. The vehicle according to the present invention provides great versatility in that it is adapted to travel over a variety of terrains including over ice and snow and over brush and other vegetation as well as other surfaces.

SUMMARY OF THE INVENTION

The improved passenger vehicle of the present invention includes a passenger carrier in the form of a tub shaped receptacle for carrying one or more passengers. The carrier is provided with a pair of runners for sliding over the ground so that all types of terrain, rough or smooth can be negotiated. If desired, small wheels can be mounted on the bottom of the carrier for easier riding over smooth terrain.

The carrier with its passenger is pushed along by a power unit that comprises a single wide wheel journalled in a frame and driven by an internal combustion engine carried on top of the frame. The single wheel is in engagement with the surface that the vehicle is traversing and serves as the driving member.

The power unit is pivotally connected to the passenger carrier and is located behind the carrier to push it forwardly. A linkage is provided from the power unit into the carrier where it is accessible to the operator for the purpose of pivoting the power unit relative to the carrier to steer the vehicle.

DESCRIPTION OF THE PREFERRED EMBODIMENT

Figure 1:
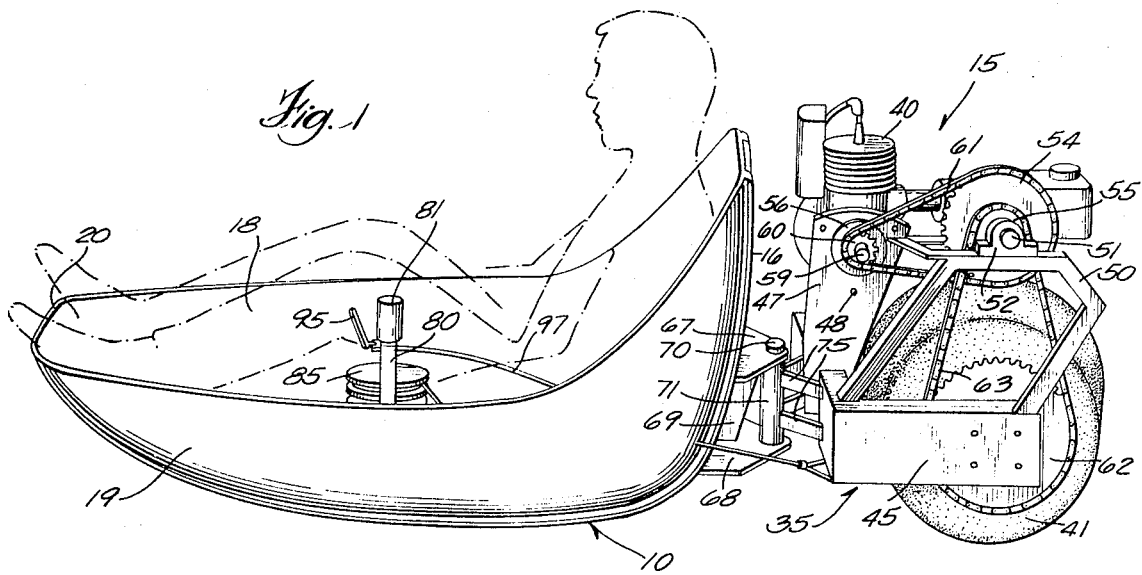
FIG. 1 is a perspective view of a power driven passenger vehicle incorporating the teachings of the present invention.

Reference is now made more particularly to the drawings and specifically to FIG. 1 thereof which illustrates a power driven passenger vehicle incorporating the features of the present invention. As there shown, the unit comprises a passenger carrier generally identified by the reference numeral 10 and a power unit generally identified by the reference numeral 15. The power unit 15 is connected to the passenger carrier 10 to propel it by pushing it along a path of travel determined by the passenger.

In the illustrated embodiment, the passenger carrier 10 is of generally tub shaped with room for one or more passengers, one passenger being illustrated by the broken lines in FIG. 1. It includes a high rear wall 16 which serves as a back rest for the passenger who is sitting directly upon the floor 17 of the carrier and is protected at the sides by side walls 18 and 19. The passenger's feet rest against the front wall 20 as shown in FIG. 1.

The carrier 10 shown in the drawings is especially adapted to slide over the surface upon which it is traveling and to this end is provided with runners generally identified by the reference numerals 25 and 26. The runners 25 and 26 are formed by elongated projections 27 and 28 which project downwardly from the outer surface of the floor 17 and extend along the length of the carrier 10 as clearly shown in FIG. 2. Hardened steel wear plates 29 and 30 are secured to the projections 27 and 28 respectively, and are secured thereto by counter-sunk screws 31.

The elongated projections 27 and 28 do not terminate at the rear terminus of the floor 17 but continue on upwardly along the outer surface of the rear wall 16. Such extension of the projections 27 and 28 serve as reinforcing ribs for the rear wall 16 to enable the wall to withstand the strain that may be placed on it as it serves as a back rest for the passenger.

The hardened steel plates 29 and 30 enable the carrier 10 to be slid along most any type of surface and especially adapt the unit for traveling over ground having vegetation such as grass, weeds, brush or the like. The runners 25 and 26 enable the unit to traverse very rough terrain, and the absence of wheels enables it to slide over depressions, holes, mounds and humps in the terrain. However, it should be understood that if it is intended to use the vehicle on a smooth surface, wheels could be provided on the underside of the carrier 10 to engage the surface over which it is traveling and thereby raise the runners 25 and 26 off of the ground. This would improve the mobility of the unit over smooth surfaces. In order to render the vehicle extremely maneuverable some or all of such wheels could be journalled in casters.

The power unit 15 is located at the rear of the carrier 10 so that it will push the carrier 10 in the path of travel as determined by the passenger. The power unit 15 comprises a frame generally identified the reference numeral 35 and which carries an internal combustion engine 40 connected to rotate a wheel 41 which serves as the driving member for propelling the unit.

Figure 2:
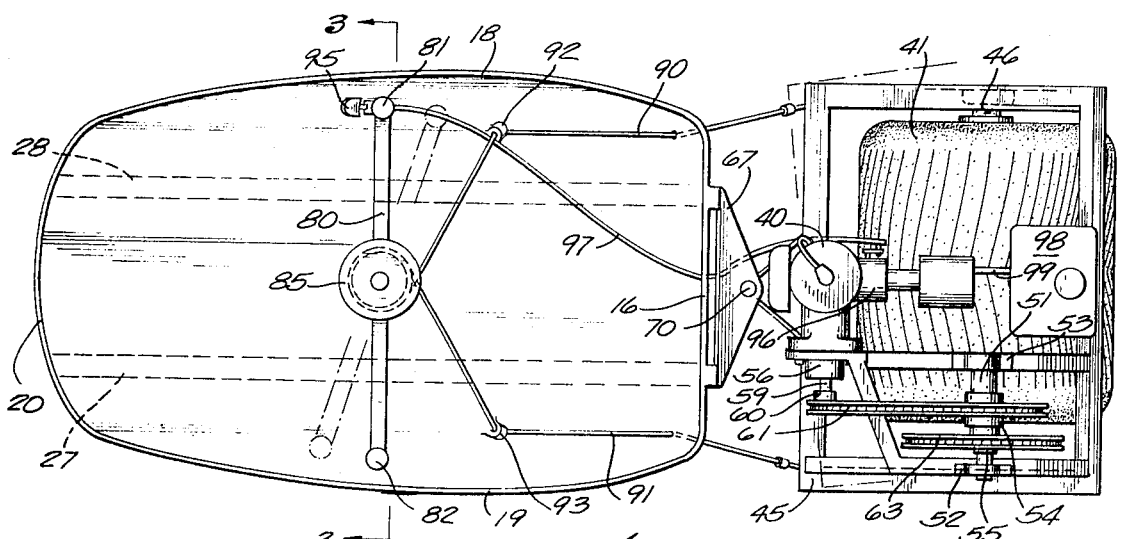
FIG. 2 is a plan view of the power driven passenger vehicle illustrated in FIG. 1.

The frame 35 includes a horizontally disposed U shaped member 45 which is formed of structural channel steel and rotatably supports a shaft 46 which carries the wheel 41 as depicted in FIG. 2. The shaft 46 is journalled in the U shape member 45, directly adjacent the ends of the legs of the U shaped member 45 and the wheel is fixed to the shaft to rotate with it.

A plate 47 extends upwardly from the U shaped member 45 to support the internal combustion engine 40, the latter being mounted to the plate 47 by means of bolts 48. The frame 25 also includes an upstanding structural assembly 50 which is secured to the U shaped member 45 and extends upwardly therefrom. A horizontal shaft 51 is journalled in a pair of trunnions 52 and 53 which are mounted on top horizontal members of the structural assembly 50. A large sprocket 54 and a small sprocket 55 are keyed to the shaft 51 to rotate with it.

The internal combustion engine 40 is connected to drive a centrifugal clutch 56 having an output shaft 59. When the engine 40 attains a pre-determined output speed the centrifugal clutch engages to drive the shaft 59 for propelling the unit. At idling speeds the centrifugal clutch 56 automatically disengages to interrupt the power drive to the wheel 41.

The power from the output shaft 59 is transmitted to the wheel 41 by a chain drive. To this end, a small sprocket 60 is keyed to rotate with the shaft 59 and a drive chain 61 is in engagement with the small sprocket 60 on the output shaft 59 and the large sprocket 54 on the shaft 51. Another large sprocket 62 is keyed to rotate with the shaft 46 and a drive chain 63 is in operating engagement with the small sprocket 55 and the large sprocket 62.

Thus, rotation of the output shaft 59 produces a corresponding rotation of the small sprocket 60 to actuate the drive chain 61. Actuation of the drive chain 61 produces a rotation of the sprocket 54 to rotate the shaft 51 which produces a corresponding rotation of the sprocket 55 which is likewise keyed to the shaft 51. Rotation of the sprocket 55 actuates the drive chain 63 to produce a rotation of the large sprocket 62 and since the latter is keyed to the shaft 46 which carries the wheel 41, the wheel 41 is rotated to propel the unit.

As previously mentioned, the power unit 15 is pivotably connected to the rear of the passenger carrier 10, and this pivotal connection is utilized to provide a simple method for steering the vehicle under the control of the passenger in the carrier 10. The pivotal connection is achieved by means of a clevis arrangement comprising a pair of parallel plates 67 and 68 extending rearwardly from the rear wall 16 of the carrier 10 and reinforced by a vertical reinforcing plate 69. The plates 67 and 68 are each provided with an aperture, the apertures being in axial alignment for receiving a pin 70.

The pin 70 extends through a sleeve 7! which is disposed between the plates 67 and 68, the sleeve 71 being secured to the cross bar of the U shaped member 45 by means of two pair of angularly disposed bars 75 each of which have one end secured to the cross bar of the U shaped member 45 and their other ends secured to the periphery of the sleeve 71. The bars 75 are attached to the sleeve 71 and the U shaped member 45 by welding or other suitable means.

The sleeve 71 can rotate relative to the pin 70 to render the entire power unit 15 pivotable with respect to the passenger carrier 10. This pivotal movement of the power unit 15 is employed for the purpose of steering the entire vehicle under the control of the passenger in the carrier 10.

The steering is accomplished by means of a steering lever 80 extending across the width of the carrier 10 and approximately centrally located with respect to the length of the carrier as clearly shown in FIG. 2. A handle 81 is fixed to one end of the lever 80 to be grasped by the right hand of the passenger, and another handle 82 is fixed to the opposite end of the lever 80 to be grasped by the left hand of the passenger with both handles 81 and 82 extending vertically upwardly from the lever 80.

Figure 3:
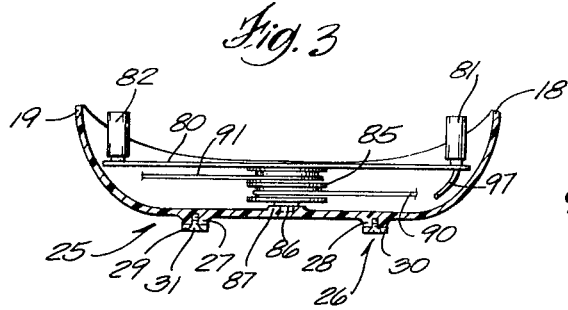
FIG. 3 is a view partly in vertical section and partly in elevation taken along the plane represented by the line 3—3 in FIG. 2.

The lever 80 is secured to a double grooved capstan 85 which is journalled to rotate about a shaft 86 that extends upwardly from a boss 87 formed in the floor 17 of the carrier 10 as illustrated in FIG. 3. Accordingly, the passenger can rotate the capstan 85 by rotating the lever 80 to which it is attached through the manipulation of the handles 81 and 82.

Rotation of the capstan 85 will cause a pivotal movement of the power unit 15 through a pair of cables 90 and 91. The cable 90 has one end secured in one of the grooves of the capstan 85 and extends rearwardly therefrom through a guide 92 and then a hole in the rear wall 16 of the carrier 10 to be attached to one corner of the U shaped member 45 of the power unit 15.

The other cable 91 is attached to the opposite corner of the U shaped member 45 and extends through another hole in the rear wall 16 of the carrier 10 on the side opposite the side through which the cable 90 passes. The cable 91 then continues through a guide 93 to be attached to the second groove in the capstan 85.

The cable 90 enters into engagement with its cooperating groove in the capstan 85 from one side of the capstan while the cable 91 comes into engagement with its cooperating groove from the opposite side of the capstan 85. As a result, rotation of the capstan 85 in a clockwise direction as viewed in FIG. 2 will place tension on the cable 90 and relax the cable 91 to pivot the power unit 15 in a counterclockwise direction. On the other hand, rotation of the capstan 85 in a counterclockwise direction, as viewed in FIG. 2, will place a tension on the cable 91 and relax the cable 90 so that the power unit 15 will pivot in a clockwise direction with respect to the carrier 10. Such pivotal movement of the power unit 15 through the operation of the cables 90 and 91 produces a steering of the entire vehicle under the control of the passenger. After a little experience the passenger can become quite adept at accurately steering the vehicle through a desired path of travel and the operation of the vehicle in this manner becomes a very amusing and entertaining sport.

The passenger controls the speed of the vehicle by manipulating a grip 95 associated with the handle 81. As shown in FIG. 2, the grip 95 is connected to the throttle of a carburetor 96 for the engine 40 by means of a flexible cable 97 which passes from the grip 95 along the floor 17 and through a hole in the rear wall 16 to the carburetor 96. The passenger can increase the speed of the vehicle by squeezing the grip 95 toward the handle 81 to open the throttle of the carburetor 96. When the passenger releases the pressure on the grip 95 a spring (not shown) will return it toward its relaxed position to close the throttle for reducing the speed of the vehicle and for bringing it to a stop.

A fuel tank 98 is mounted at the rear top of the upstanding structural assembly and is connected to supply fuel to the carburetor 96 by a length of tubing 99.

The wheel 41 may take a variety of forms, as for example, an extremely wide wheel, as shown in the drawings, with a tire filled with air and having extremely heavy cleats. Such a wheel will provide adequate traction over different terrains including ice and snow. Of course, if greater traction is desired, as for traversing over very smooth ice, metal cleats could be provided on the periphery of the wheel 41 for obtaining such traction.

From the foregoing detailed description of the illustrative embodiment of the invention set forth herein it will be apparent that there has been provided an improved power driven passenger vehicle that is especially adapted for traversing a variety of surfaces including extremely rough and unimproved terrain with heavy vegetation to provide locomotion over areas which may be difficult to traverse by foot as well as to provide sport and amusement to the passenger.

Although the illustrative embodiment of the invention has been described in considerable detail for the purpose of disclosing a practical operative structure whereby the invention may be practiced advantageously, it is to be understood that the particular vehicle described is intended to be illustrative only and that the various novel characteristics of the invention may be incorporated in other structural forms without departing from the spirit and scope of the invention as defined in the subjoined claims.

The principles of the invention having now been fully explained in connection with the foregoing description of the illustrative embodiment, the invention is hereby claimed as follows:

1. In a passenger vehicle; a tub shaped receptacle serving as a passenger carrier adapted to travel over a surface and having a floor on which the passenger sits while riding in the vehicle, the rear wall of said receptacle extending upwardly so as to form a back rest for the passenger; a motor disposed behind said carrier; a driving member in engagement with the surface for propelling said motor along the surface and to thereby push said carrier along the surface; a coupling pivotally connecting said motor to said back wall of said receptacle so that the vehicle may be steered by pivoting said motor relative to said carrier; and a centrifugal clutch connecting said motor to said driving member, said clutch being engaged by the speed of said motor so that it becomes engaged to drive said driving member at a predetermined speed of said motor for propelling the vehicle and is disengaged at idling speeds of said motor for disconnecting said motor from said driving member.

2. In a passenger vehicle; a tub shaped receptacle serving as a passenger carrier adapted to travel over a surface and having a floor on which the passenger sits while riding in the vehicle, the rear wall of said receptacle extending upwardly so as to form a back rest for the passenger; a power unit disposed behind said carrier and having a driving member in engagement with the surface for propelling said power unit along the surface and to thereby push said carrier along the surface; a coupling pivotally connecting said power unit to said back wall of said receptacle so that the vehicle may be steered by pivoting said power unit relative to said carrier; and runners extending along the exterior surface of said floor for slideable engagement with the surface over which the vehicle is traveling; said runners extending upwardly along said rear wall of said receptacle to reinforce said back rest to provide sufficient strength for supporting the back of the passenger.

3. A passenger vehicle according to claim 2 including; a frame supporting said power unit, and said driving member comprises a single wheel rotatably supported by said frame and connected to be rotated by said power unit; and a pneumatic tire on said wheel to provide traction over a wide variety of surfaces while protecting such surfaces from damage.

4. In a passenger vehicle, a passenger carrier adapted to travel over a surface; a power unit disposed behind said carrier and having a driving member in engagement with the surface for propelling said power unit along the surface and to thereby push said carrier along the surface; a coupling pivotally connecting said power unit to said carrier so that the vehicle may be steered by pivoting said power unit relative to said carrier; a capstan rotatably supported in said passenger carrier; an elongated lever having two ends secured to said capstan; a grip on each end of said lever located so that each grip can be grasped by one hand of the passenger so that the passenger can manipulate said lever for rotating said capstan in either direction; a first cable having one end wound around said capstan in one direction and its other end connected to a first side of said power unit; a second cable having one end wound around said capstan in the opposite direction to said first cable and its other end being connected to the second side of said power unit so that rotation of said lever in one direction will relax said first cable and apply tension to said second cable for pivoting said power unit in one direction relative to said carrier, and rotation of said lever in the other direction will relax said second cable and apply tension to said first cable for pivoting said power unit in the other direction relative to said carrier.

5. A passenger vehicle according to claim 4 including; a centrifugal clutch connecting said motor to said transmission, said clutch being engaged by the speed of said motor so that it becomes engaged to drive said transmission at a predetermined speed of said motor and is disengaged at idling speeds of said motor for disconnecting said motor from said transmission.

* * * * *